INVENTOR.
JOHN LANSCH

INVENTOR.
JOHN LANSCH

United States Patent Office 3,525,019
Patented Aug. 18, 1970

3,525,019
POWER PROTECTION APPARATUS
John Lansch, Elm St., Upper Nyack, N.Y.
Filed July 20, 1967, Ser. No. 654,799
Int. Cl. H02h *3/28, 7/00*
U.S. Cl. 317—27        3 Claims

ABSTRACT OF THE DISCLOSURE

A power protection circuit for use with single or polyphase AC power lines for reliably connecting and disconnecting a load from the lines including semiconductor switching devices connected in series with each of the lines and made responsive to unbalances in voltage or current in the line. The semi-conductor devices are triacs which have their control gates selectively connected or disconnected from their respective lines in response to a voltage phase balance bridge circuit or a toroidal current balance network coupled to the lines.

---

Figure 1:
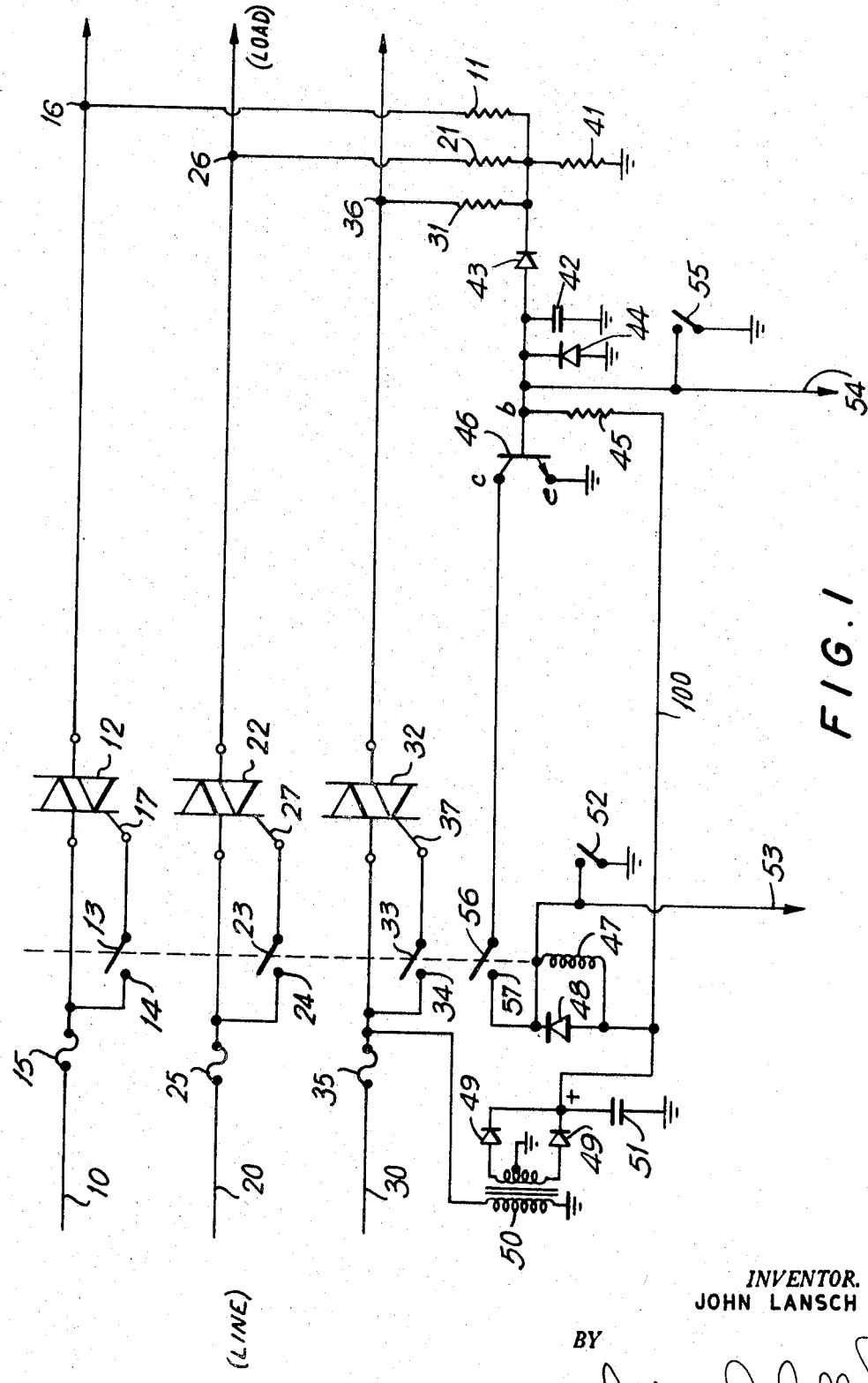

The present invention relates to a high speed alternating current fault sensing apparatus for disconnecting power from a load in response to an overload or unbalanced condition.

More specifically, the present invention relates to a single or multi-phase alternating current protective circuit which interrupts the load from a power line in response to power overloads or unbalances.

Conventional circuits utilized for electrical overload and unbalanced protection generally employ slow acting relay devices or circuit breakers requiring high current mechanical contacts for protecting the load from the power source. These relay devices have the disadvantage that sudden power surges, overloads, or unbalances may cause damage to the load before it may be sufficiently disconnected from the power source. Moreover, protective circuits using relay-type devices often fail to operate when required and cause severe damage to the load for which they are designed to protect.

Accordingly, the present invention provides a protective overload and unbalance circuitry which overcomes the above-described disadvantages of conventional circuits by utilizing semi-conductor switching devices having fast switching times and high reliability. In one embodiment of the invention for protecting a polyphase load, triac semi-conductor devices are connected in series with each of the power lines and are made responsive to a bridge circuit which senses voltage unbalances between each of the lines. In another embodiment of the invention the semi-conductor switching devices which are connected in series with the power lines are made responsive to one or more toroid current detection coils. The toroid detection coils surround each of the polyphase power lines which serve as the primary windings to the coils. The coils also include secondary windings which are coupled through a voltage comparison circuit which compares the magnitude of the current with that of a fixed reference source so that any departure in current from the fixed reference will produce a signal at the output of the comparator to trip each of the silicon switches and disconnect the load from the line. In a three-phase, four-wire system the circuit, according to the invention, two toroidal detection coils are utilized for detecting both excessive currents in the phases and the absence or decrease in current in any one or more of the phase lines. In a two-phase, three- or four-wire system, only a single toroid detection coil is required for protecting the line from excessive or deficient current values.

It is therefore an object according to the present invention to provide a power protection apparatus for single or polyphase power lines utilizing series connected semiconductor switching devices which are made responsive to unbalanced or overload conditions existing on the lines.

It is another object according to the present invention to provide a protection apparatus for interrupting a load from a single or polyphase line utilizing triac switching devices which are responsive to overload or unbalanced currents or voltages.

It is still a further object according to the present invention to provide a power protection apparatus for effectively disconnecting a load from a single or polyphase power line which is simple in design, easy to manufacture, and reliable in operation.

Other features and objects of the present invention will become apparent from the following detailed description considered in connection with the accompanying drawings which disclose embodiments of the invention. It should be understood, however, that the drawings are designed for the purpose of illustration only and not as a definition of the limits of the invention as to which reference should be made to the appended claims.

Figure 2:
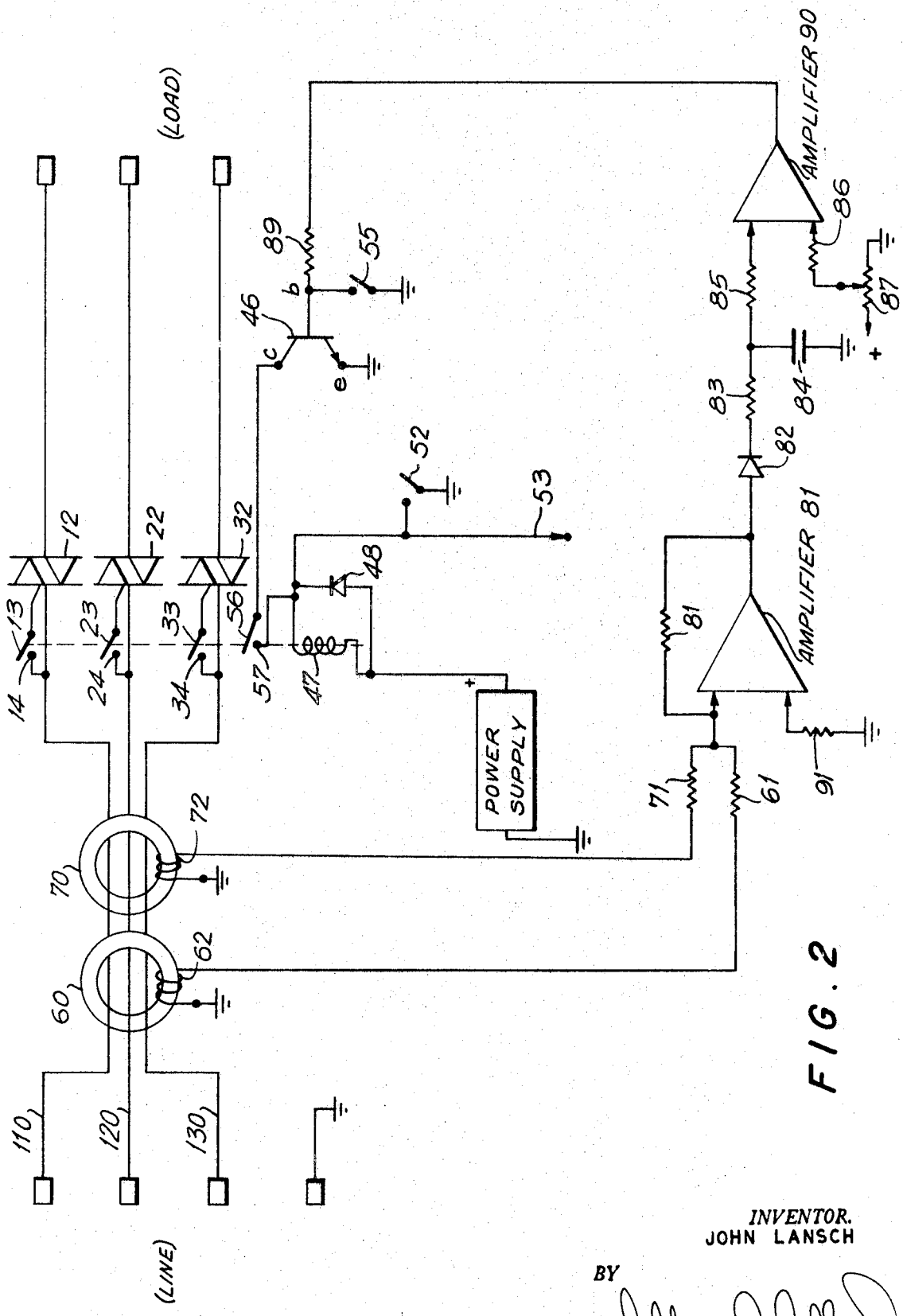

In the drawings wherein similar reference characters denote similar elements throughout the several views:

FIG. 1 is a schematic diagram of one embodiment of the overload protection apparatus according to the invention for use with three-phase, four-wire systems, and FIG. 2 is a schematic diagram of another embodiment of the overload protection apparatus according to the invention for use with three-phase, three- or four-wire systems and the like.

Referring to FIG. 1 there is shown a schematic diagram of one embodiment of the protective circuit according to the invention connected to polyphase lines 10, 20 and 30 in a typical three-phase, four-wire system. On the input side of each of lines 10, 20 and 30 are included current limiters 15, 25 and 35 which may consist of circuit breakers, fuses or other devices designed to limit the current flow through each of the alternating current lines. Connected to line 30, adjacent to current limiter 35, is the primary of transformer 50. Coupled to the secondary of transformer 50 is a conventional full wave rectifier power supply, including diodes 49 and filter capacitor 51. The output of rectified supply produces a direct current potential for operating the semi-conductor control devices utilized within the protective circuit.

Connected in series with each of lines 10, 20 and 30 are triacs 12, 22 and 32. The triacs are solid state, five layer, semi-conductor gate-controlled bi-directional conducting devices which have been recently developed for switching alternating currents of reasonably large magnitudes. Each of the triacs have their gate controls 17, 27 and 37 connected to relay contacts arms 13, 23 and 33, shown in a normally-open position. Each of the relay contact arms is respective to relay coil 47.

Coupled to each of the outputs 16, 26 and 36 of lines 10, 20 and 30, adjacent to the load resistors 11, 21 and 31 respectively which are utilized to monitor each phase. The monitoring resistors are connected at a common point to grounded resistor 41 to form a balanced resistor bridge configuration. The common point of the bridge is connected through diode 43 to the base of transistor amplifier 46. The output of diode 43 is also connected to the shunt combination of charging capacitor 42 and diode clamp 44. The base *b* of transistor amplifier 46 is also connected to the output of the rectified power supply through resistor 45. The collector of transistor 46 is connected to contact arm 56 which is also responsive to relay coil 47. Connected across relay coil 47 is a diode 48 which serves to protect transistor 46 from voltage surges and transients produced by the interruption of the current in relay coil 47.

The protection circuit of FIG. 1 operates as follows:

When power is applied to the input of lines 10, 20 and 30 in order to supply power to the load connected at the opposite end, the rectified power supply connected to transformer 50 becomes energized and produces a positive DC potential on line 100. A positive bias is also applied to the base $b$ of transistor 46 through resistor 45. With relay coil 47 initially deenergized, triac control gates 17, 27 and 37 of triac switches remain disconnected from their respective line sources so that triacs 12, 22 and 32 are initially nonconducting and power applied to the lines will not reach the load. However, if relay coil 47 becomes energized, such as by closing switch 52, or connecting line 53 to ground potential at a remote location, contact arms 13, 23, 33 and and 56 will close simultaneously to turn on the triac switches. The collector of transistor 46 will also become connected to the DC power source and cause transistor 46 to conduct, due to its positive bias, so that relay coil 47 will remain energized after ground potential has been disconnected from line 53.

If an unbalance in voltage occurs at the output of one or more of the polyphase lines as a result of a short circuit or an interruption in the line, an unbalance in potential will occur between resistors 11, 21 and 31 causing diode 43 to conduct during the negative half-cycle of the unbalanced voltage. Capacitor 42 will then charge negatively and counteract the positive bias applied to the base of transistor 46 until transistor 46 becomes "turned-off." This will interrupt the current supplied to relay coil 47 causing it to become deenergized and open contacts 13, 23, 33 and 56 to disconnect the line power from the load. In addition, excess current on any one or more phases will open the corresponding current limiters 15, 25 and 35 which are in series with each of lines 10, 20 and 30. In the event that only a single current limiter opens, a voltage unbalance will occur between the phases to cause relay coil 47 to interrupt triacs 12, 22 and 32 as previously described.

In order to manually disconnect power from the load, switch 55 may be closed to apply ground potential to the base of transistor 46 thus turning it off. This will in turn deenergize relay coil 47 to open contact arms 13, 23 and 33, so as to turn off triacs 12, 22 and 32, thus removing the AC power from the load.

In a similar manner, the line power may be reconnected to the load by either closing switch 52 or applying ground potential to line 53 to complete the connection across relay 47 and cause contact arms 13, 23 and 33 to close so that triacs 12, 22 and 32 will conduct.

For applications utilizing three-phase, three-wire, and three-phase, four-wire systems, the circuit as shown in FIG. 2 may be employed. The circuit utilizes two current detection toroids 60 and 70, wherein the main power lines 110, 120 and 130 pass through the center of the toroids and serve as their primary winding. Toroid coil 60 is connected so that two phases of the main power lines are coupled in their normal phase relationship while the third phase is coupled 180° out of phase. The result at the output of secondary winding 62 will be a signal which is in phase with the third phase when shifted 180°, and twice the magnitude of any single phase contribution.

Toroid detection coil 70 is connected with all three power lines serving as primaries in their proper phase. This produces at the output of its secondary winding 72, a zero output signal as long as the current magnitudes in each phase are equal, a situation customarily found under normal operating conditions. The outputs of secondary windings 62 and 72 are connected through summing resistors 61 and 71, respectively, to amplifier 81. Amplifier 81 may consist of an integrated circuit-type or a micro-circuit amplifier having the capability of passing up to 1000 cycles per second. The output of amplifier 81 is coupled to a peak detection circuit consisting of diode 82, resistor 83, and capacitor 84, the values of which are selected to produce a time delay of approximately 0.5–1.0 second in order to compensate for any initial current surge which may occur during the "turn on" cycle. The output of the peak detector is coupled through resistor 85 to amplifier 90 having characteristics similar to amplifier 81. Amplifier 90 has a response time of less than .001 second and is capable of detecting a 50 millivolt differential in signal input with respect to its second input coupled through resistor 86 to reference potentiometer 87. The output of amplifier 90 is coupled through resistor 89 to the base of transistor 46 and controls relay coil 47 in a manner similar to that described with respect to FIG. 1.

To connect power from the line to the load, switch 52 is momentarily closed so as to energize relay coil 47. Relay contact arms 13, 23 and 33 connected to the control bridge of triacs 12, 22 and 32 will then close to turn on the triacs and connect the load to each of lines 110, 120 and 130. If the load is operating under a normal balanced condition, detection coil 60 will produce at its output a signal having twice the value of any one phase contribution while detection coil 70 will produce a zero signal. These signals are summed through amplifier 81 and are compared at the input of amplifier 90 with the reference voltage set on potentiometer 87. Potentiometer 87 is preset to produce a voltage slightly greater than the magnitude of the signal appearing at the other input of amplifier 90 under normal conditions so that amplifier 90 will remain turned "off." This in turn keeps transistor 46 turned "on" to maintain relay coil 47 energized so that the power remains connected to the load.

If one or more of phase lines 110, 120, or 130 becomes overloaded, the output of detection coil 60 will increase causing an increase on the input of amplifier 90 which if slightly larger than the reference potential set on potentiometer 87, will turn "on" amplifier 90. This will in turn produce a negative signal at the output of amplifier 90 so as to turn "off" transistor 46 and deenergize relay coil 47. Triacs 12, 22 and 32 will then disconnect the load from lines 110, 120 and 130.

In the event that one of lines 110, 120 or 130 becomes interrupted so that excessive current will be drawn by the other two phases, detection coil 60 will have difficulty detecting such an interruption unless the currents in each phase increase to much greater than normal values. Thus detection coil 70 has been included to produce a significant output apart from its normal zero output if any one phase fails. The output from secondary winding 72 is amplified, detected and when exceeding the preset voltage on the other input of amplifier 90, will produce at its output a signal to turn off transistor 46 and thus remove the power from the load as previously described.

The circuit of FIG. 2 may be operated to connect the line into the load by means of closing switch 52 or applying a ground potential to remote connection 53. In a manner similar to FIG. 1 the load may be interrupted from the line by depressing switch 55 connected to the base of transistor 46.

The circuit of FIG. 2 may be modified for use with two-phase, three-wire systems, or two-phase, four-wire power control systems. Under these circumstances, detection coil 70 is eliminated together with resistor 71 and only two power lines pass through the center of coil 60 to form the primary winding thereof. The circuit will then operate in a similar detecting and protection manner as that for the above-described three-phase system.

The circuits of FIG. 1 and FIG. 2 may be combined to produce both a current and voltage sensing protection system by a simple interconnection whereby similarly numbered components may be utilized for both functions.

While only a few embodiments of the present invention have been shown and described, it will be understood that many changes and modifications may be made thereunto

What is claimed is:

1. A power protection apparatus for protecting a load coupled to one or more alternating current power lines of a three phase system having at least three conductors comprising;

a first toroid having as a primary winding two wires coupled in phase and a third wire coupled 180° out of phase, a second toroid having as a primary winding all three phases connected in balanced relationship under normal operating conditions for sensing excessive and unbalanced currents in the lines, reference potential means for providing a predetermined signal level, control means coupled to said first and second toroids and said reference potential means for producing at its output a signal responsive to the unbalance between said inputs, and at least one triac switch in series connection with each of said power lines and responsive to said first and second toroids for interrupting the power to the load.

2. The apparatus as recited in claim 1 wherein said control means comprises a first amplifier for summing the phase contributions from each of the secondaries of said toroids, a second amplifier coupled to the output of said first amplifier for comparing the resultant phase contribution with said reference potential means and producing an output responsive to the difference between said reference and said contribution, and relay means, responsive to the output of said second amplifier for disconnecting said control grids from said lines to turn off said triac switches.

3. The apparatus as recited in claim 2 wherein said control means additionally comprises a peak detection circuit intermediate said first and second amplifiers for producing the peak amplitude of said phase contribution signal.

References Cited

UNITED STATES PATENTS

| | | | |
|---|---|---|---|
| 3,132,287 | 5/1964 | Yarbrough | 317—33 |
| 3,165,671 | 6/1965 | Mintz et al. | 317—27 |
| 3,286,129 | 11/1966 | Gagniere | 317—27 |
| 3,328,606 | 6/1967 | Pinckaers. | |

J D MILLER, Primary Examiner

H. FENDELMAN, Assistant Examiner

U.S. Cl. X.R.

317—33, 46